No. 690,406. Patented Jan. 7, 1902.
G. DAVIS.
ELECTRIC RAILWAY.
(Application filed Nov. 19, 1900.)
(No Model.) 3 Sheets—Sheet 1.
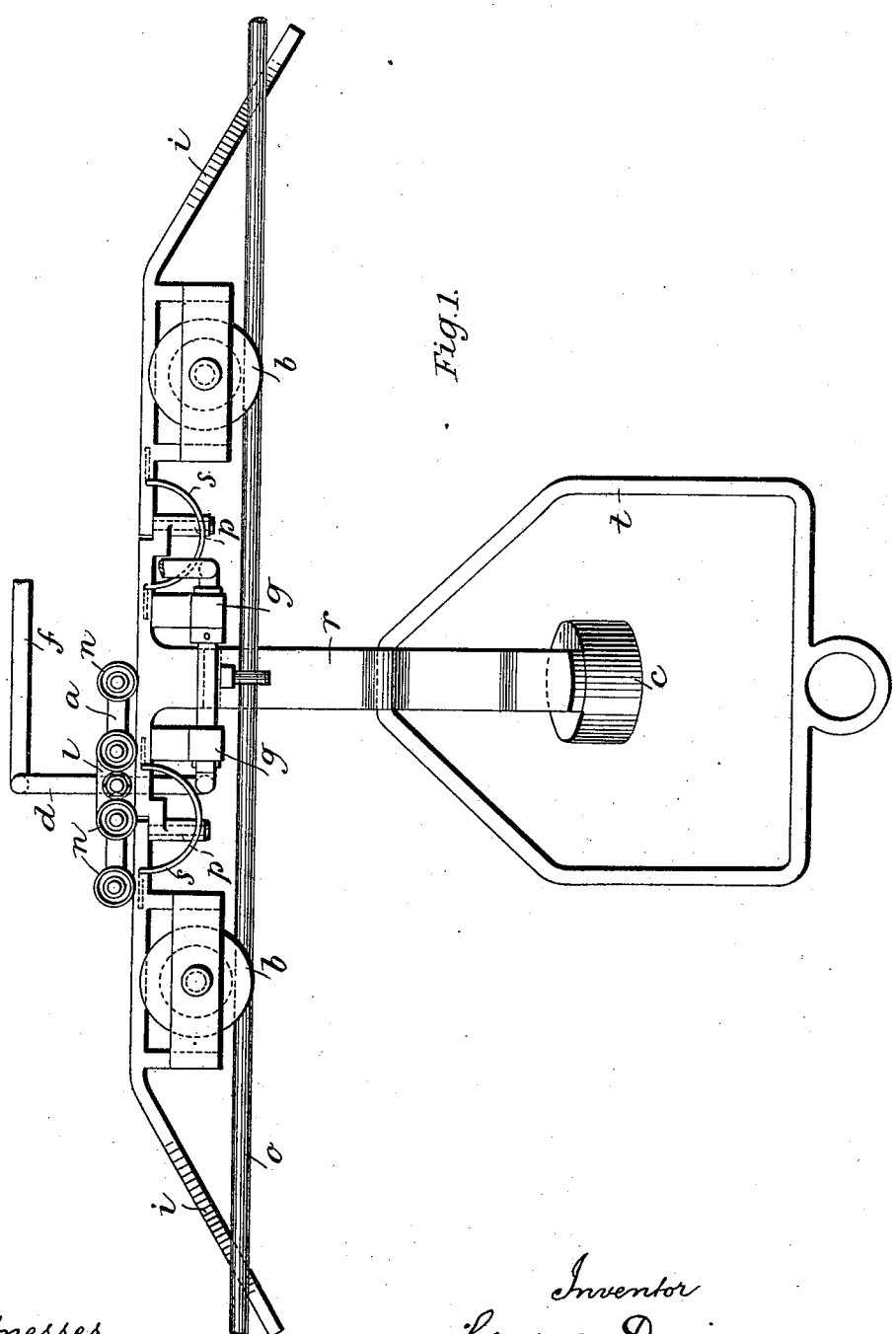

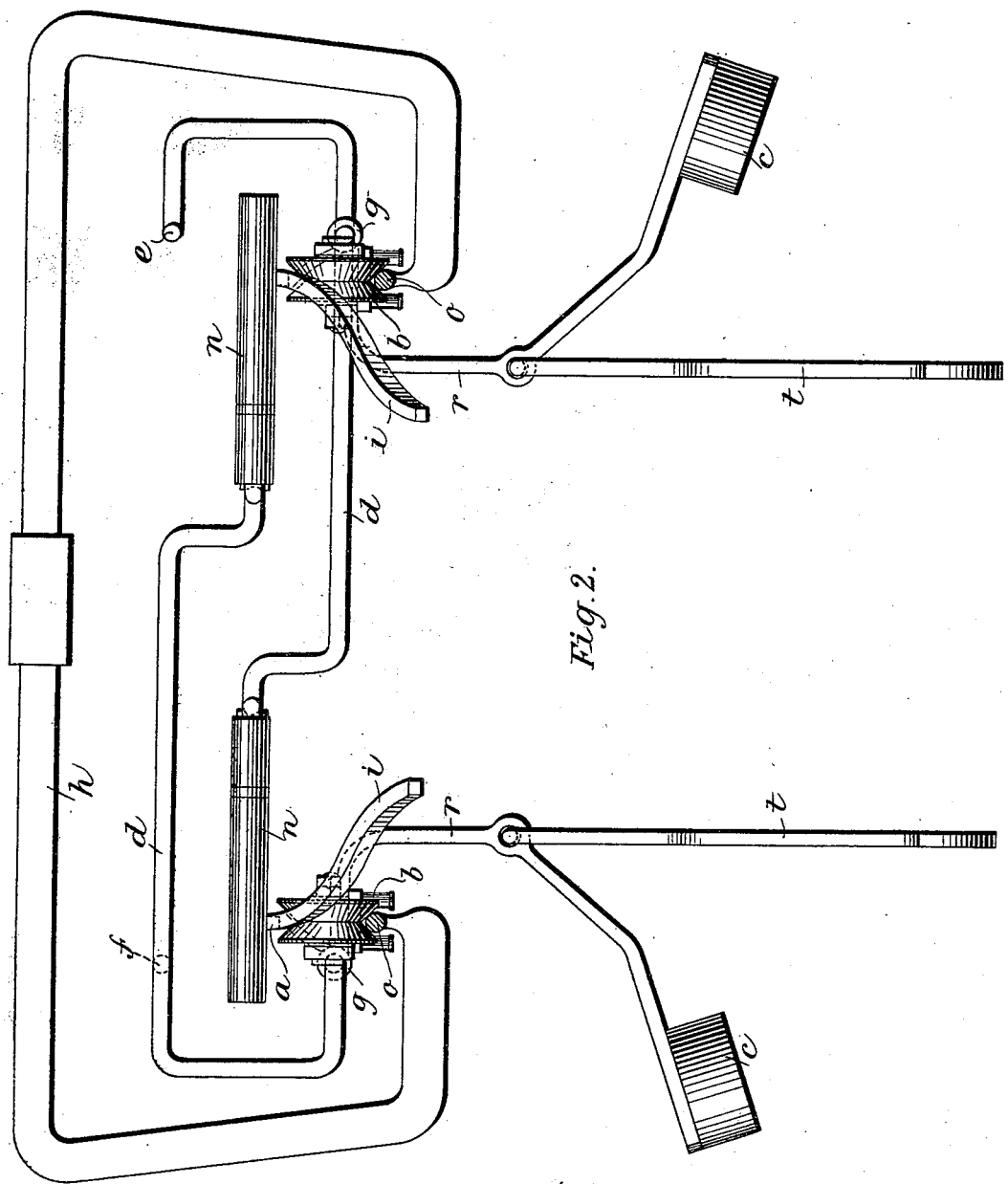

No. 690,406. Patented Jan. 7, 1902.
G. DAVIS.
ELECTRIC RAILWAY.
(Application filed Nov. 19, 1900.)
(No Model.) 3 Sheets—Sheet 3.
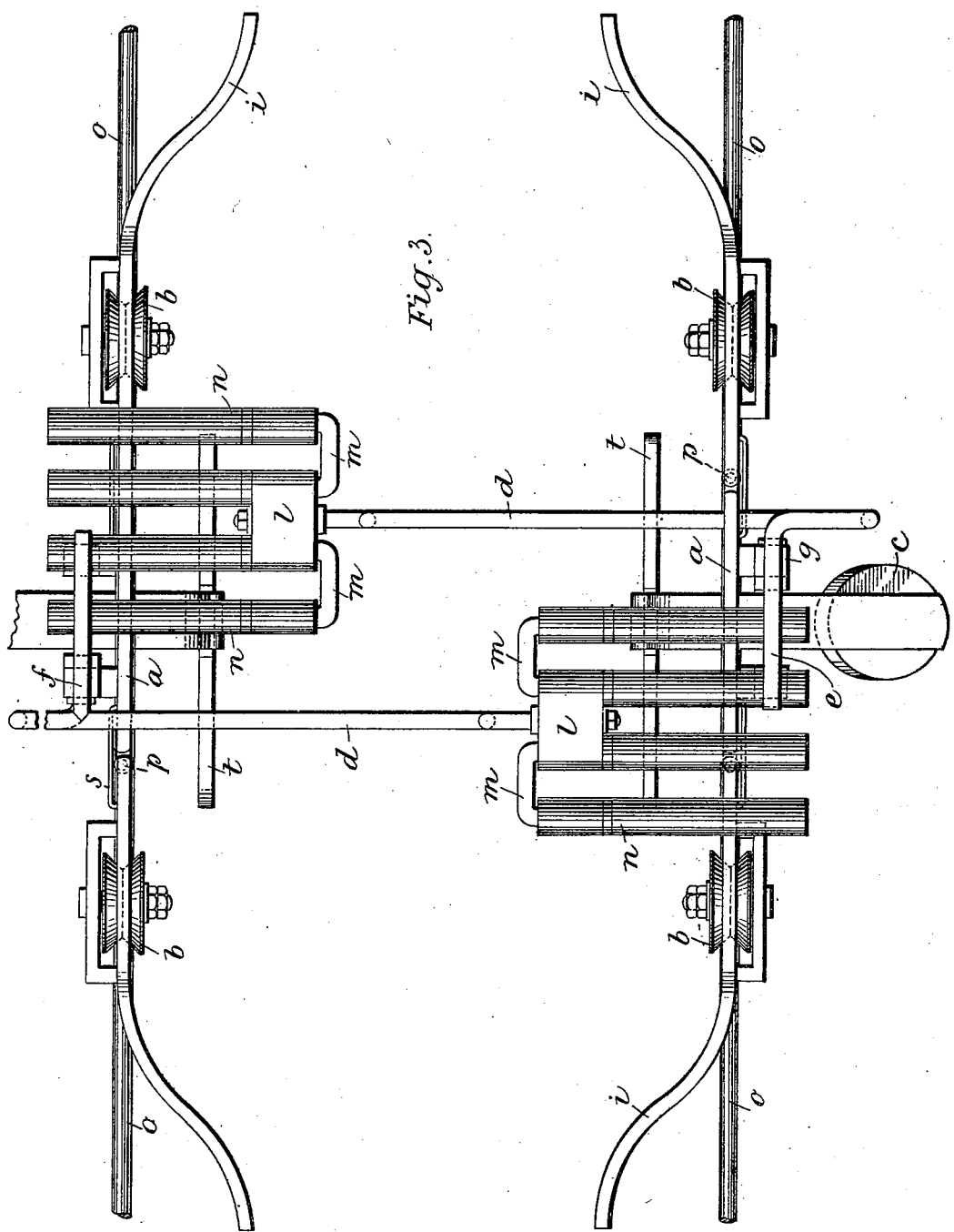
Witnesses
Albert Jones
Samuel Percival
Inventor
George Davis
By his Attorneys
Wheatley & MacKenzie

UNITED STATES PATENT OFFICE.

GEORGE DAVIS, OF WEST KENSINGTON, ENGLAND.

ELECTRIC RAILWAY.

SPECIFICATION forming part of Letters Patent No. 690,406, dated January 7, 1902.

Application filed November 19, 1900. Serial No. 37,011. (No model.)

*To all whom it may concern:*

Be it known that I, GEORGE DAVIS, a subject of the Queen of Great Britain and Ireland, residing at 38 Margravine Gardens, West Kensington, in the county of London, England, have invented certain new and useful Improvements in Electric Railways, (for which I have made application for patent in Great Britain on April 27, 1900, No. 7,784;) and I do hereby declare the following to be a full, clear, and exact description of the invention, such as will enable others skilled in the art to which it appertains to make and use the same.

This invention for an improved system of distribution and collection of current for electric traction relates to that class of system in which there are positive and negative overhead conductors and in which the current is collected from the conductors and distributed to the vehicle to be propelled by a trolley running on the overhead conductors and connected to the vehicle, and consists in enabling the outgoing and incoming trolleys to pass one another on the same conductors without interruption of current. In carrying out this invention the trolley consists of a framework suspended on two wheels adapted to run on one conductor, an arm hinged to the framework and resting on the other conductor, and a bridge or bow secured to and extending over the framework. In operation the outgoing trolleys run on one overhead conductor and the incoming trolleys on the other conductor, and the arms of, say, the incoming trolleys are higher than those of the outgoing to enable the arms to pass one another. When two trolleys meet and pass, each arm slides up and over the bridge of the other trolley. The arms are so constructed and attached that they can be easily transformed from high to low, or vice versa, when being transferred from one conductor to the other.

In the accompanying three sheets of illustrative drawings, Figure 1 is a side elevation of a trolley constructed according to this invention, and Figs. 2 and 3 are respectively end elevation and plan of two such trolleys passing one another.

The trolley consists of a bridge or frame $a$, provided with wheels $b$ and the counterweight $c$. The bridge $a$ is situated well above the wheels $b$ and has forward and rearward-inclines $i$, that pass below the wheels and at one side. It will thus be seen that any device bearing on a wire or rail $o$ meeting such a trolley running on the wire or rail will be gradually lifted off the wire and slide up the bridge over the trolley. In order to facilitate the trolley passing around curves, the bridge is formed in divisions hinged together at $p$, the parts being normally kept straight by the springs $s$.

The arm $d$ is provided with two projecting spindles or axles $e\ f$, each adapted to fit into the bracket $g$ on the bridge. The bracket $g$ is fitted with insulating-bushes to insulate the arm from the trolley. When the trolley is going out, the spindle $e$ is used, the arm taking the position shown on the left trolley in Fig. 2, and when the trolley is going home the spindle $i$ is used, the arm then taking the position shown on the right in Fig. 2. The outer end of the arm is provided with a contact shoe or rollers $n$ at such distance from the trolley that when the trolley is running on one of a double line $o$ the contact shoe or rollers will run on the other line $o$. By this arrangement, as is clearly shown in Fig. 2, where two trolleys are running in opposite directions on a double line, the outgoing trolley running on the outgoing line, with its contact-rollers on the incoming line, and the incoming trolley on the incoming line, with its contact-rollers on the outgoing line, and the spindle $e$ of one trolley is inserted in the bracket $g$ and the spindle $f$ of the other trolley in its bracket, the trolleys will pass one another without the arms coming into contact by the arms being raised up and over the trolleys, the contact shoe or rollers running over the bridges, as clearly shown in Fig. 2.

As shown, the trolley is adapted to be dragged along the line $o$ by the flexible conductors connecting it to the vehicle to be propelled, the conductors passing down the dependent tail $r$ from the bridge, and thence passing to the end of a shackle-link $t$, linked to the tail $r$. By this arrangement the drag on the trolley is kept high and the trolley and counterweight are free to oscillate without affecting the hauling-conductors.

In order to keep the lines o parallel and at the proper distance apart, the lines o are provided at suitable distances apart with separators h, the dependent tail r of the trolley being shaped, as shown, to miss the separators.

The current passes from one line o through the trolley-wheels b to the frame a, thence by a flexible conductor to the vehicle to be propelled back by another flexible conductor to the arm d and by the contact-rollers n on the arm to the other line o. It will be seen that the current to the propelled vehicle is not interrupted even when the two trolleys are passing.

The contact on the arm consists of a bracket l, pivoted on the end of the arm and having pivoted in it the two U-supports m, on which the rollers or tubes n are mounted. By this arrangement all four rollers or tubes bear on the line o.

What I claim, and desire to secure by Letters Patent, is—

1. A trolley running on double rails and consisting of a main and a supplemental contact and an arm connecting the contacts and so bent or shaped as to pass wholly without or wholly within the arm of another similar trolley running on the same rails in the opposite direction substantially as described.

2. A trolley consisting of a framework adapted to run on one of two parallel conductors, an arm hinged to the framework and adapted to rest on the other conductor and so bent or shaped as to pass wholly without or wholly within the arm of another similar trolley running on the same rails in the opposite direction, and a bridge or bow on the framework and extending above or inside the framework and below or outside the conductor for the purpose specified.

3. A trolley consisting of a framework adapted to run on one of two parallel conductors, an arm having two spindles by either of which it can be hinged to the framework so as to pass over the bridge or under the bridge as desired for the purpose specified, and a bridge or bow on the framework and extending above the framework and below the conductor for the purpose specified.

4. A trolley consisting of a bridge or framework mounted on wheels adapted to run on one of two conductors, a detachable arm adapted to be attached rigidly to insulated sockets in higher or lower positions, carried by the framework and to slide on and in contact with the other conductor, so that, on meeting another similar trolley running on the same conductors in the opposite direction, the arms of each trolley are raised and pass over the bridges of the respective trolleys, the trolleys pivoting on the conductors.

5. A pair of trolleys for the purposes described each consisting of a main and a supplemental contact connected together by an arm, such arms being so bent or shaped that on meeting the arm of the one trolley passes wholly without or wholly within the arm of the other as set forth.

In testimony whereof I affix my signature in presence of two witnesses.

GEORGE DAVIS.

Witnesses:
ALBERT JONES,
WALTER J. SKERTEN.